United States Patent [19]

McCrone

[11] Patent Number: 4,658,847
[45] Date of Patent: Apr. 21, 1987

[54] BIMETALLIC C-RING SEAL

[75] Inventor: James A. McCrone, Columbia, S.C.

[73] Assignee: The Fluorocarbon Company, Los Alamitos, Calif.

[21] Appl. No.: 753,272

[22] Filed: Jul. 9, 1985

[51] Int. Cl.[4] .......................... E06B 1/00; F16J 15/12; F16K 17/40; F16K 43/00

[52] U.S. Cl. ........................................ 137/72; 49/475; 49/480; 49/489; 251/174; 251/315; 277/26; 277/152; 277/205

[58] Field of Search .................. 251/315, 174; 49/475, 49/480, 489; 277/26, 152, 153, 205, 1; 137/72

[56] References Cited

U.S. PATENT DOCUMENTS

| | | | |
|---|---|---|---|
| 1,857,961 | 5/1932 | Lamb | 277/26 |
| 3,361,430 | 1/1968 | Reid | 277/26 |
| 3,604,716 | 9/1971 | Webert | 277/26 |
| 3,831,950 | 8/1974 | Bentley et al. | 49/475 X |
| 3,901,517 | 8/1975 | Heathcott | 277/205 |
| 4,286,614 | 9/1981 | Kaeal et al. | 251/315 X |
| 4,304,409 | 12/1981 | Orlowski | 277/205 X |
| 4,327,895 | 5/1982 | Blumenkranz et al. | 251/315 |
| 4,519,412 | 5/1985 | Grazioli | 277/26 X |

FOREIGN PATENT DOCUMENTS

| | | | |
|---|---|---|---|
| 610973 | 9/1926 | France | 277/26 |
| 888138 | 1/1962 | United Kingdom | 277/26 |

OTHER PUBLICATIONS

Fluorocarbon Metallic C-Rings brochure, 1983 by The Fluorocarbon Co.
Aeroquip Omniseal Catalog 115, 1972 by Aeroquip Corp.

*Primary Examiner*—Allan N. Shoap
*Attorney, Agent, or Firm*—Knobbe, Martens, Olson & Bear

[57] ABSTRACT

A self-actuating temperature sensitive seal comprised of a bimetallic C-ring. Differences in the relative rates of thermal expansivity of the inner face and the outer face of the C-ring cause the C-ring to expand or contract in response to temperature variations. Expansion of the C-ring will create a seal, and contraction of the C-ring will remove the seal between the surfaces surrounding the C-ring. The bimetallic ring may also be used in combination with a spring-biased soft seal made of a fluorocarbon polymer, such as Teflon, to form a fire-safe composite seal. In cryogenic applications, the bimetallic C-ring can provide a seal by itself, or as a biasing element within a surrounding soft jacket.

6 Claims, 6 Drawing Figures

BIMETALLIC C-RING SEAL

BACKGROUND OF THE INVENTION

This invention relates generally to a temperature sensitive seal assembly, and more particularly to a C-ring seal.

In many applications, a sealing assembly may be subject to extreme variations in temperature, for instance if a fire or explosion occurs and must be contained by the seal. While seals which can withstand severe temperature and pressure conditions do exist, it is often impractical in terms of the requirements of the normal operating environment to use such a seal for the relatively few occurrences of such severe conditions. Generally, high temperature seals are not resilient enough to be suitable as dynamic seals or in uses where a seal must be repeatedly created and removed, and resilient seals generally cannot withstand high temperatures.

For instance, a military tank door which is repeatedly opened and closed requires a "soft" seal, made of Teflon ® or an elastomer, during normal operations, but also requires a seal which can withstand the occasional severe conditions mentioned above, when they occur.

In another application, a valve through which inflammable fluids pass must be "fire-safe" to prevent leakage when a fire destroys the "soft" seals. Prior fire-safe valves have utilized a redundant seal assembly consisting of a soft seal which, if destroyed by fire, is backed up by a high temperature metal seal or a Graphoil ® packing. This back up seal is operative regardless of the temperature, and thus in addition to the wear of the back up seal during normal operation, the back up seal generates a large amount of friction, which is undesirable. Further, since the "soft" seal is not integral with the back up seal, a separate groove generally must be machined within the valve for each seal to be retained.

A special seal can also be advantageous in cryogenic applications. Typical materials used in cryogenic seals become brittle and contract as the temperature decreases, thus providing a weaker seal or even allowing clearance between the seal and its surrounding surfaces precisely when a strong seal is required. In this situation, a Teflon ® seal, which normally becomes less effective as temperatures drop because of thermal shrinkage and stiffening, could still be operative at cryogenic temperatures if a greater biasing force were applied to force it into sealing engagement with the surrounding surfaces. However, prior biasing elements will also contract and become less effective at cryogenic temperatures, instead of providing a greater biasing force.

Thus, a need exists for a self-energizing seal which is able to withstand and be effective under severe temperature conditions.

SUMMARY OF THE INVENTION

Briefly stated, the present invention is a temperature sensitive seal comprised of a tubular bimetallic element. The inner and outer surfaces of the tube preferably comprise two different metals, each with a correspondingly different rate of thermal expansivity. An axial slot or cavity runs throughout the length of the tube, allowing the cross-sectional area of the tube to change. Depending on which metal has the higher rate of expansivity, an increase or decrease in temperature will cause the cross-sectional area of the tube to expand or contract, thereby creating or removing the seal, respectively, between the tube and the surrounding surfaces. Preferably, the tube is circular in cross section and with the cavity forms a C-shape.

In one embodiment of the invention designed for fire-safe applications, a bimetallic C-ring is used in combination with a second "soft" seal comprised of a material such as Teflon ® or other fluorocarbon polymer. The second seal may be spring-biased so that it continuously engages the surrounding surfaces. The C-ring would not be operative as a seal unless the temperature varied sufficiently to cause it to expand into sealing engagement with the surrounding surfaces, at which time the second seal would generally be destroyed or rendered inoperative as a result of the temperature.

In another embodiment of the invention, for use in cryogenic applications, the surfaces of the bimetallic C-ring are arranged so that the seal expands as the temperature decreases. A C-ring of this type can be used as a seal by itself, or as a biasing element within a surrounding soft jacket.

DETAILED DESCRIPTION OF THE PREFERRED EMBODIMENTS

Figure 1:
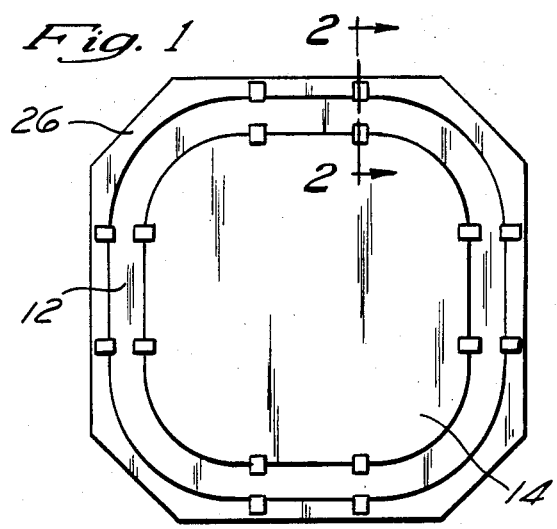
FIG. 1 is a top view of a door in a military tank.

FIGS. 1–4 illustrate the bimetallic C-ring seal 10 in a fire-safe composite seal 12 which is utilized in the door 14 of a military tank. In the present embodiment, the C-ring 10 is formed into a ring in the shape of the perimeter of the door 14, as shown in FIG. 1. The ring can also be manufactured in various other shapes, whether regular or irregular. Viewed in cross section, the C-ring 10 is tubular, and has a slot or cavity 16 in an otherwise circular cross section which runs longitudinally throughout the tube's length, thereby forming a C-shape. The cavity 16 is defined by the opposed edges 15 and 17 of the two legs of the C-shape. The tube and cavity may be formed into other cross-sectional shapes as well.

The bimetallic C-ring 10 is comprised of a first metallic strip 18 which forms the internal surface of the C-ring, and a second metallic strip 20 bonded to the first metallic strip 18 and forming the outer surface of the C-ring. In this embodiment, the first strip 18 has a higher rate of thermal expansivity than the second strip 20. Higher temperatures will cause the greater expansion of the first strip 18 to be compensated by the separation of the edges 15 and 17, widening the slot 16 and increasing the cross-sectional area of the C-ring.

The exact amount of expansion of the C-ring for a given temperature variation can be predetermined. These parameters are not only functions of the temperature itself, but also of the differential in expansivity rates, and of the cross-sectional size and shape of the C-ring.

Figure 2:
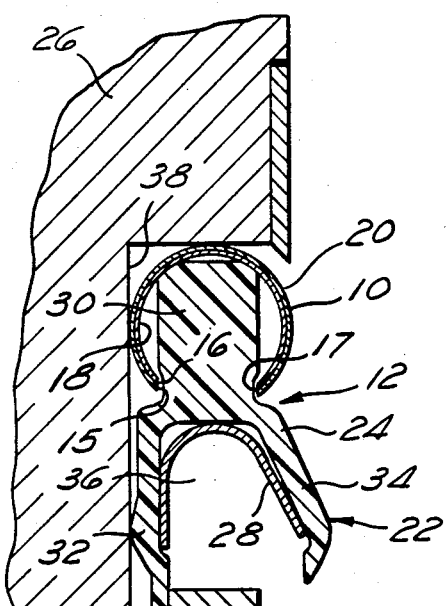
FIG. 2 is a cross section of the seal assembly in the door, taken along the line 2—2 in FIG. 1.
Figure 4:
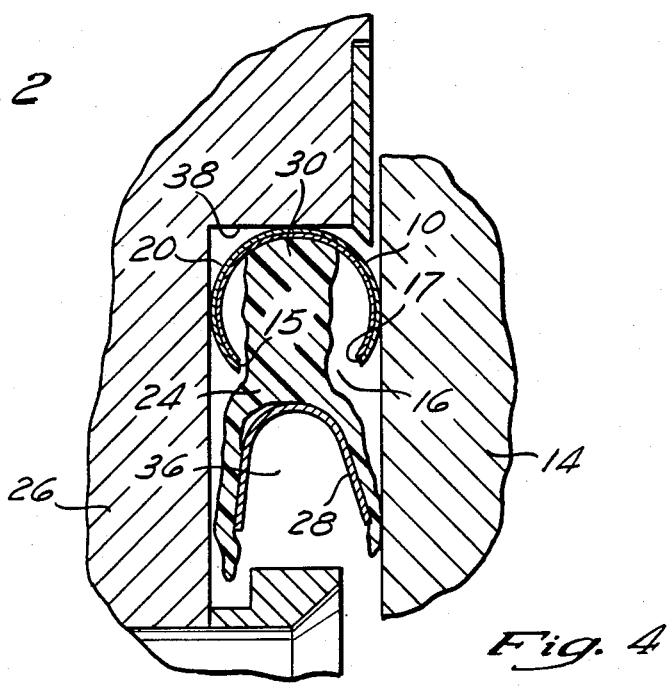
FIG. 4 is the cross section of FIG. 2 with the door in the closed position and after the seal assembly has been subjected to extremely high temperatures.
Figure 3:
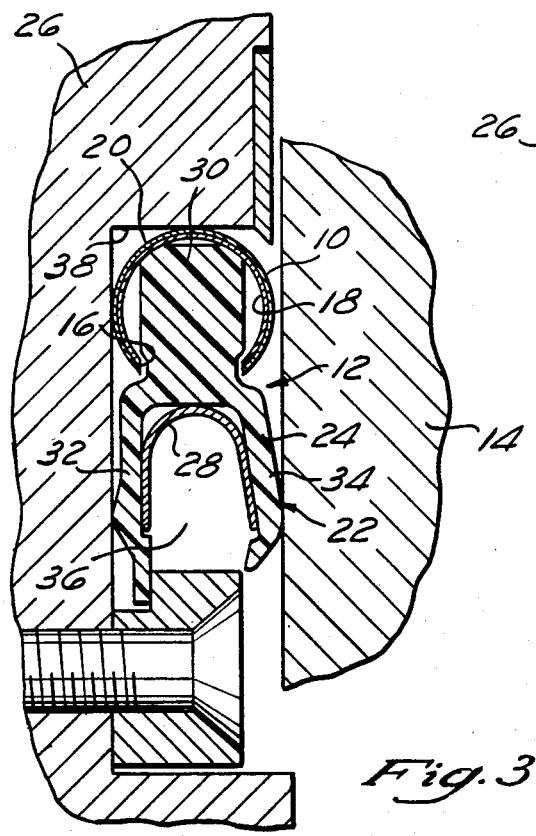
FIG. 3 is the cross section of FIG. 2 with the tank door in the closed position.

The bimetallic C-ring in FIGS. 2–4 is part of a composite seal 12 comprised of the C-ring and a second, "soft" seal 22. This soft seal 22 consists of a jacket 24 made from a suitable material such as Teflon ® or some other polymer with properties similar to Teflon ®, such as another fluorocarbon polymer, which is biased into sealing engagement with the door 14 and frame 26 by the resilient spring 28. The jacket 24 and spring 28 are both rings which are shown as adjacent the bimetallic ring throughout its length. Alternatively, the soft seal and bimetallic C-ring may be separated, while still sealing the same surfaces; in this case the door and frame.

The jacket 24 has an annular head portion 30 which is inserted through the cavity 16 and which provides a support or seat for the C-ring. Extending from the head portion 30 are two flexible lips or legs 32 and 34, both of which are annular rings that together define an annular channel 36. Lodged within this channel 36, and adjacent the internal surfaces of the lips 32 and 34, is the U-shaped biasing member or spring 28. The spring 28 resiliently biases the lips outward, and is depicted in FIG. 2 in its fully extended and relaxed state. The composite seal is retained within the groove 38, which is formed in the frame 26.

In FIG. 3, the door 14 is shown in the closed position, and compressing the spring. The compressed spring biases the external faces of the lips 32 and 34 into sealing engagement with the frame and door, respectively. FIG. 3 also shows the configuration of the C-ring in the range of normal operating temperatures, in which there is clearance between the C-ring and the door, so that only the soft seal is operative in sealing the frame and door.

FIG. 4 illustrates the composite seal while being subjected to extremely high temperatures, as in a fire or an explosion. The jacket has been destroyed by the heat and now allows clearance between the arms and the door, even though the spring is fully relaxed. However, the C-ring has expanded as a result of the high temperature, and now sealingly interferes with the door to contain the fire. The door illustrated is useful to enclose an ammunition compartment within the tank, which must be sealed from the crew in the event of an explosion, yet must be normally accessible to the crew.

After the temperature returns to the normal operating level, the C-ring automatically contracts. The C-ring portion of the composite seal will resume its original size and shape and be reusable if the explosion or other cause of extreme high temperature does permanently deform the C-ring.

In this embodiment, the soft seal 22 is operative at normal temperatures, and is suited for applications where a resilient seal is needed due to the repeated formation and removal of the sealing engagement between the seal and its adjacent surfaces, as in a frequently opened door. The bimetallic C-ring acts as a safety mechanism and becomes operative as a seal only when temperatures reach a level at which the soft seal has been rendered useless.

Figure 5:
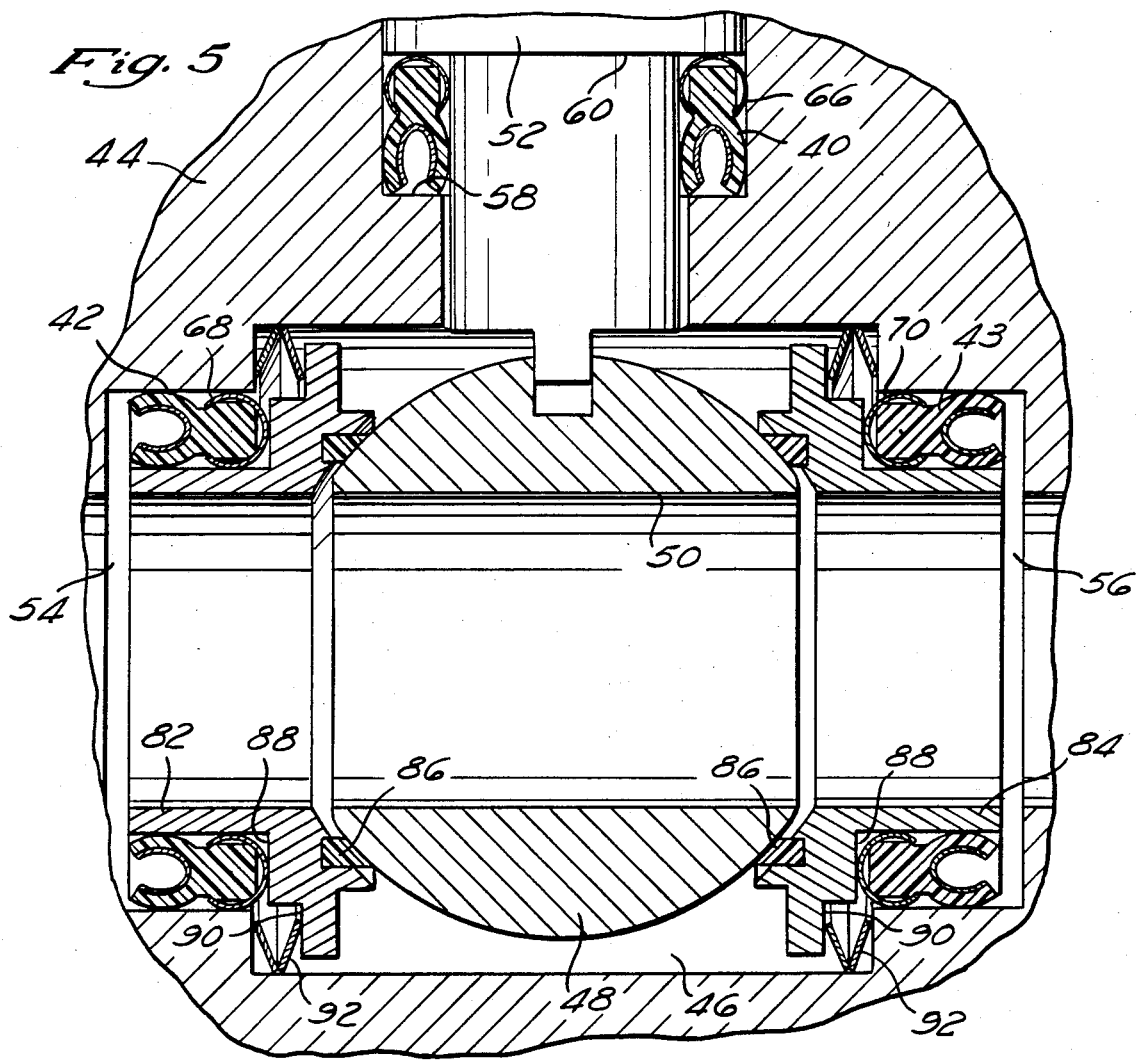
FIG. 5 is a cross-sectional view of a ball valve incorporating the seals of the invention.

FIG. 5 illustrates composite seals 40, 42, 43 within a ball valve. The valve is comprised of a housing 44 which defines a chamber 46. Within the chamber 46 is a ball 48 having a fluid passage 50 extending through its center. The ball is attached to a rotatable valve stem 52 which extends through the housing and enables the ball to be rotated from the exterior of the housing. When the passage in the ball is aligned with the inlet 54 and outlet 56 passages through the housing, the valve is in the open position. The valve is closed by rotating the ball so the passages do not line up.

Composite seal rings 40, 42, and 43 are utilized to provide seals at three different places within the valve. One ring 40 is between the housing 44 and the valve stem 52, and is retained by a shoulder 58 in the housing 44 and a boss 60 on the valve stem 52. Additional composite seal rings 42 and 43 are positioned between the housing 44 and adaptors or seats 82 and 84, which are adjacent both the inlet 54 and outlet 56 passages, respectively. The seats 82 and 84 are annular in shape and include a tubular portion having an inner diameter corresponding to the inlet and outlet passages 54 and 56. The ball 48 rotates relative to the seats 82 and 84 which generally remain stationary within the housing 44. The seats 82 and 84 include dynamic ring-shaped seals 86, preferably formed from Teflon, to seal the passages between the seats 82 and 84 and the ball 48.

The composite seals 42 and 43 surround the radially outer surface of the tubular portion of seats 82 and 84, and are retained by shoulders 88 to provide a seal between the housing 44 and the seats 82 and 84. Each seat also includes a radially extending flange forming a shoulder 90 against which a pair of belville washers 92 resiliently bias the seats 82 and 84 into the ball so that the dynamic seals 86 sealingly engage the ball 48.

In the event of fire, inflammable fluid passing through the valve would be prevented from leaking out of the housing due to the expanded bimetallic C-rings 66, 68, and 70 of the composite seals.

A bimetallic C-ring which expands as temperatures increase can also be employed without a jacket or soft seal in situations where a seal is not required at ambient temperatures, but is required at high temperatures; for example, when an explosive gas is being vented. The C-ring would effectively be an automatic safety valve which closes to stop flow at increased temperatures, when the danger of an explosion is high.

Figure 6:
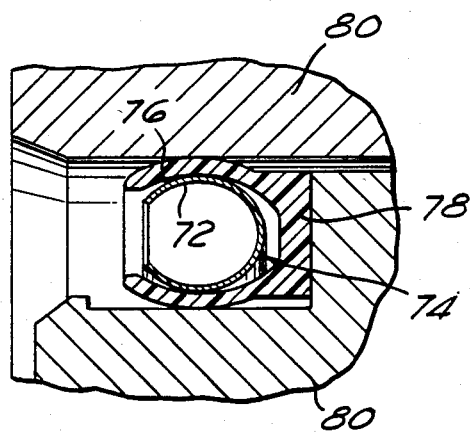
FIG. 6 is a cross-sectional view of a seal using a bimetallic ring as a biasing element within a jacket.

In another embodiment of the invention, depicted in FIG. 6, the first metallic strip 72, or inner face of the C-ring 74, has a lower rate of thermal expansivity than does the second strip 76, or outer face. The C-ring thereby expands as temperature decreases.

This type of bimetallic C-ring is utilized in cryogenic applications as a resilient spring within a soft jacket 78, made from a suitable material such as Teflon ® or other fluorocarbon polymer. Like most biasing elements, the spring force of the compressed C-ring against the inner surface of the jacket causes the outer surface of the jacket to sealingly engage the adjacent surfaces 80, at ambient temperatures. However, prior biasing elements exert a lesser biasing force at cryogenic temperatures, and coupled with the stiffness and contraction of the jacket, results in a poorer quality seal as temperature decreases. In the present embodiment, the ineffectiveness of the jacket is compensated for by the expansion of the C-ring and resulting increased biasing force as the temperature lowers.

This increased sealing force is advantageous at cryogenic temperatures because it compensates for the poorer sealing characteristics of most surfaces in extreme cold due to brittleness. As temperature decreases, minimizing leakage is critical due to the cost of cooling the cryogenic fluid, and its potentially hazardous nature. Prior metallic seals used in these applications contract and exhibit poorer sealing characteristics in extreme cold, whereas the bimetallic seal will expand to improve the quality of the seal.

In another embodiment, a C-ring of this type is allowed to provide a seal between its surrounding surfaces at room temperature, without a jacket. As temperatures reach the cryogenic level, the C-ring will expand and exert a greater force against the surfaces, and maintain a tighter seal.

A C-ring which contracts at higher temperatures can also be utilized as a self-actuating high temperature relief valve. Likewise, a C-ring which contracts at low temperatures can act as a relief valve to allow drainage of fluids which expand at lower temperatures, such as water upon freezing.

Bimetallic C-rings may be fabricated with the cavity in various orientations, so as to face the direction of higher pressure, which will force the C-ring to expand and provide a tighter seal. The C-ring 10 shown in FIGS. 1–4 has a cavity which faces radially inward, or toward the center of the ring. In contrast, the cavity on the C-ring 66 in FIG. 5 faces axially, relative to the stem 52 which it surrounds. In an embodiment not illustrated, a C-ring may be formed with a cavity facing radially outward, or away from the center of the ring which it forms.

What is claimed is:

1. A seal assembly comprised of:
   a first seal comprised of a bimetallic tube with a slot running longitudinally along the length of said tube so as to form a substantially C-shaped cross section, said bimetallic tube being comprised of two metallic strips having differing rates of thermal expansivity and respectively forming the inner and outer surfaces of the tube, so that changes in temperature cause the differing amounts of expansion in said strips to be compensated by changes in the width of the slot, causing the tube to expand or contract;
   a second seal positioned adjacent the first seal in a manner to provide the primary seal with respect to adjacent surfaces housing the seal assembly during normal temperature conditions, said second seal being of soft material destructible at extreme temperatures that causes said first seal to expand or contract, a biasing member forcing a portion of said soft material into sealing engagement with the adjacent surfaces, said first seal being positioned and constructed so that the first seal does not sealingly engage the adjacent surfaces at normal operating temperatures, and in the event of an extreme variation in temperature rendering said second seal inoperative, said first seal would respond to the said temperature variation and sealingly engage said adjacent surfaces;
   wherein said first and second seals are perimetric when viewed from above, and said second seal includes a jacket portion which is axial of said bimetallic ring throughout its length, and a head portion which is attached to said jacket and extends through said slot in said C-shaped first seal to provide a seat for said first seal, said jacket having a pair of lips forming an annular channel; and
   said biasing member is lodged within the channel to provide a resilient expanding force on the lips, causing the external surfaces of the lips to sealingly engage the adjacent surfaces.

2. The seal assembly of claim 1, further comprising a door in a military tank and a frame onto which the door closes, said seals providing a fire-safe seal between the door and frame.

3. The seal assembly of claim 1, further comprising a ball valve including a housing having a chamber formed therein, and having an inlet passage and an outlet passage to said chamber, a ball within the chamber having a passage through it, a valve stem attached to the ball and extending through the housing, to rotate the ball within the chamber to an open or closed position, one of said seals located between the ball and the housing adjacent both the inlet passage and the outlet passage.

4. The apparatus of claim 3, further comprising a pair of annular seats within the chamber and adjacent the inlet and outlet passages respectively, wherein one of said seal assemblies surrounds each of said seats to provide a seal between said housing and said seats, said seats further comprising a dynamic seal to provide a seal between said ball and said seats.

5. The apparatus of claim 4, further comprising a biasing means to resiliently bias each of said seats so that said dynamic seals provide a sealing engagement between said ball and said seats.

6. The apparatus of claim 3 including one of said seals located in the housing to provide a fire-safe seal between the valve stem and the housing.

* * * * *